US011544657B2

(12) United States Patent
MacAdam et al.

(10) Patent No.: US 11,544,657 B2
(45) Date of Patent: *Jan. 3, 2023

(54) ROADWAY MAINTENANCE CONDITION DETECTION AND ANALYSIS

(71) Applicant: State of Ohio, Department of Transportation, Columbus, OH (US)

(72) Inventors: John A. MacAdam, Columbus, OH (US); David L. Holstein, Xenia, OH (US); Thomas M. Lyden, Hilliard, OH (US); Sonja R. Simpson, Pickerington, OH (US); Scott E. Lucas, Ashley, OH (US)

(73) Assignee: State of Ohio, Department of Transportation, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/160,645

(22) Filed: Jan. 28, 2021

(65) Prior Publication Data

US 2021/0150445 A1 May 20, 2021

Related U.S. Application Data

(63) Continuation of application No. 16/564,997, filed on Sep. 9, 2019, now Pat. No. 10,936,987, which is a continuation of application No. 13/840,978, filed on Mar. 15, 2013, now Pat. No. 10,410,160.

(51) Int. Cl.
*G06Q 10/06* (2012.01)
*G08G 1/00* (2006.01)
*G08G 1/01* (2006.01)

(52) U.S. Cl.
CPC ......... *G06Q 10/06398* (2013.01); *G08G 1/00* (2013.01); *G08G 1/0104* (2013.01)

(58) Field of Classification Search
CPC .. G06Q 10/06398; G08G 1/00; G08G 1/0104; G08G 1/09; G06F 7/00
See application file for complete search history.

(56) References Cited

U.S. PATENT DOCUMENTS

| | | | |
|---|---|---|---|
| 6,535,141 | B1 | 3/2003 | Doherty |
| 7,400,267 | B1 | 7/2008 | Doherty et al. |
| 7,714,705 | B2 | 5/2010 | Rennie et al. |
| 7,839,301 | B2 | 11/2010 | Doherty et al. |

(Continued)

OTHER PUBLICATIONS

"Development of New Performance Measure for Winter Maintenance by Using Vehicle Speed Data", C Lee, WY Loh, X Qin, M Sproul—... Research Record: Journal . . . , 2008—trrjournalonline.trb.org (Year: 2008).*

(Continued)

*Primary Examiner* — Andre D Boyce
*Assistant Examiner* — Stephen S Swartz
(74) *Attorney, Agent, or Firm* — Standley Law Group LLP; Jeffrey S. Standley; Adam J. Smith

(57) ABSTRACT

A system and method for analyzing the effectiveness of road maintenance efforts within a district is provided. Data obtained from roadway weather information stations and a traffic data monitoring system is gathered to determine when weather events begin and end based upon weather conditions and traffic information. The effectiveness of roadway maintenance efforts after the end of such weather event is determined.

19 Claims, 12 Drawing Sheets

(56) References Cited

U.S. PATENT DOCUMENTS

| | | | |
|---|---|---|---|
| 8,275,522 B1* | 9/2012 | Groeneweg | G06Q 10/06 701/50 |
| 8,902,081 B2* | 12/2014 | Groeneweg | G08G 1/096775 340/905 |
| 2002/0008637 A1 | 1/2002 | Lemelson et al. | |
| 2004/0030670 A1 | 2/2004 | Barton | |
| 2005/0010365 A1 | 1/2005 | Chapman et al. | |
| 2006/0136090 A1 | 6/2006 | Koromyslov et al. | |
| 2009/0043486 A1* | 2/2009 | Yang | G01C 21/3492 701/117 |
| 2010/0131202 A1 | 5/2010 | Dannevik et al. | |
| 2011/0029243 A1 | 2/2011 | Gallagher et al. | |
| 2013/0197889 A1* | 8/2013 | Mewes | G06Q 10/0639 703/6 |

OTHER PUBLICATIONS

"Performance Measurement for Highway Winter Maintenance Operations" L Qiu, WA Nixon—2009—iihr.uiowa.edu (Year: 2009).*

"Development of a road weather information system (RWIS) network for Alberta's national highway system", MF Pinet, A Lo—Intelligent Transportation Systems, 2003—conf.tac-atc.ca (Year: 2003).*

"Estimation of Winter Snow Operation Performance Measures with Traffic Data" E Kwon, S Hong, S Kim, S Jeon—2012—conservancy.umn.edu (Year: 2012).*

Bean, R.W., Automated Performance Measurement of Winter Road Maintenance Results, The 2005 Mid-Continent Transportation Research Symposium, Aug. 2005.

Strong, C. et al., Development of a Roadway Weather Severity Index, Aug. 2005.

Nixon, W. et al., Sixth International Symposium on Snow Removal and Ice Control Technology, Transportation Research Circular, Jun. 2004.

Boon, C.B. et al., Road Weather Information Systems: Enabling Proactive Maintenance Practices in Washington State, Research Report, Washington State Transportation Center (TRACO), Mar. 2002.

Lee, C. et al., Development of New Performance Measure for Winter Maintenance by Using Vehicle Speed Data, Transportation Research Record, Journal of Transportation Research Board, No. 2055, pp. 89-98, 2008.

Rosenbloom, S. et al., Winter Maintenance and Surface Transportation Weather, International Conference on Winter Maintenance and Surface Transportation Weather, Apr. 30-May 3, 2012.

Kwon, E. et al., Estimation of Winter Snow Operation Performance Measures with Traffic Data, Minnesota Department of Transportation Research Services, Dec. 2012.

Qiu, L. et al., Performance Measurement for Highway Winter Maintenance Operations, Iowa Highway Research Board, Jun. 2009.

Pinet, M. et al., Development of a Road Weather Information System (RWIS) Network for Alberta's National Highway System, Intelligent Transportation Systems, 2003.

Bacon, J. et al., Using Real-Time Road Traffic Data to Evaluate Congestion, 2011.

Kwon, T. et al., Road/Weather Information System Architecture for Integration and Expansion, Transportation Research Record, 2000.

Bhoraskar, R. et al., Wolverine: Traffic and Road Condition Estimation using Smartphone Sensors, 2012.

Zwahlen, H. et al., Evaluation of ODOT Roadway/Weather Sensor Systems for Snow & Ice Removal Operations—Part V: Vehicular Speed Associated with Winter Pavement Conditions, 2006.

http://www.ops.fhwa.dot.gov/Weather/mitigating_impacts/surveillance.htm, web.archive.org webpage of Apr. 7, 2009.

https://ops.fhwa.dot.gov/weather/faq.htm, web.archive.org webpage of Mar. 20, 2009.

* cited by examiner

ROADWAY MAINTENANCE CONDITION DETECTION AND ANALYSIS

CROSS-REFERENCE TO RELATED APPLICATIONS

This application is a continuation of U.S. application Ser. No. 16/564,997 filed Sep. 9, 2019, which is a continuation of U.S. application Ser. No. 13/840,978 filed Mar. 15, 2013, the disclosures of all of which are hereby incorporated by reference as if fully restated herein.

BACKGROUND AND SUMMARY OF THE INVENTION

Exemplary embodiments of the present invention relate generally to the monitoring of, and reporting on, the effectiveness of roadway maintenance efforts to remove snow and ice accumulation by measuring the resulting impact to road traffic.

Governmental and other agencies responsible for the maintenance and repair of roadways are often tasked with caring for many hundreds even thousands of miles of roadway. In northern climates, where winter weather can bring snow and ice accumulation, these roadways must frequently be plowed and salted in order to allow vehicles to move safely. Maintenance agencies may employ or contract with large numbers of resources to provide these plowing and salting services. These resources may utilize a variety of equipment and methods to maintain road surfaces. A means of monitoring maintenance efforts to ensure the greatest impact for a given amount of expense may be highly desirable due to the expense involved in managing snow and ice accumulations and the public safety concerns which may arise should management efforts prove ineffective. Such monitoring may be used to determine the effects of the variety of factors which may impact the maintenance process. Such factors may comprise the quantity available snow removal equipment, frequency of a removal, equipment type used, materials applied to the road surface to improve traction and melt snow and ice, and the pre-treatment of road surfaces. Those skilled in the art will understand that this list is only a partial list of possible factors influencing maintenance of roadways subject to accumulations of snow and ice.

Monitoring and reporting on the performance of roadway maintenance may be accomplished by monitoring traffic and weather data and analyzing the effects of weather on traffic flow. In one embodiment of the present invention, weather data may be obtained from a Road Weather Information System ("RWIS"). RWIS systems may comprise a plurality of weather monitoring stations located proximately to roadways. RWIS data may be monitored to determine if there has been an occurrence of snow or freezing rain on or near a roadway. When weather data indicates that conditions may be unfavorable to road travel, the impact of such conditions may be determined via the monitoring of traffic speeds. In order to detect such an impact, monitored traffic speed may be compared to historically expected "normal" speeds for a given time of day, day of the week and time of year. Traffic speed may be obtained from data compiled from various sensors and GPS reporting devices. It may be determined that traffic flow is being impacted when traffic speed is below a predetermined threshold of expected "normal" speed. Unfavorable weather conditions (such as snow or ice), combined with a negative impact on traffic patterns may be referred to as a "weather event." To determine the effectiveness of road maintenance activities, the amount of time required after such an "event" ends until traffic speed recovers to a normal speed may be measured and compared to predetermined time thresholds. If traffic recovers before a predetermined period of time elapses, the road maintenance effectiveness is considered maximal. If traffic speed does not recover before a second predetermined period of time elapses, effectiveness is considered minimal. The system of the present invention processes the received data and generates an effectiveness report for a given zone, or a given roadway, or a given geographic region.

The monitoring described above may also be performed by review of recorded data where such data may be retrieved from databases containing combined road speed and weather information, in certain embodiments of the invention, such monitoring may be performed in "real-time" (or near real-time), using streams of live data from weather and traffic speed detection systems. In an embodiment of the invention, road speeds and weather conditions may be associated by time throughout the period of time for which maintenance performance data is to be determined. Such data may be collected for large geographic areas and the subdivided into districts or other units of geographic measure as may be required to efficiently manage maintenance resources.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Figure 1:
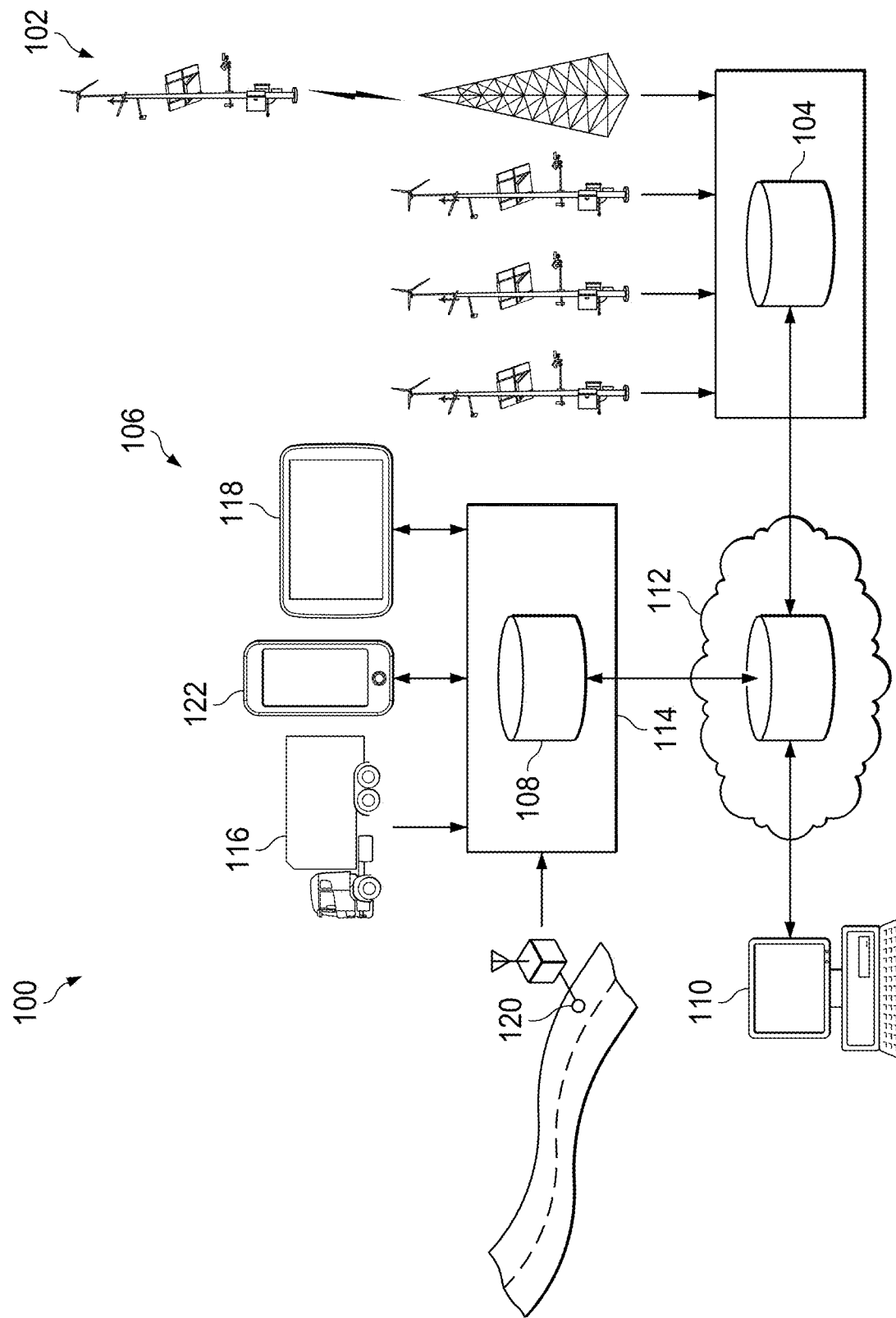
FIG. 1 is a graphic representation of an embodiment of the present invention.

As illustrated in FIG. 1, an exemplary embodiment of a system 100 to perform the present invention may comprise one or more RWIS systems 102 to gather weather data; a database containing weather data compiled from RWIS systems or other sources 104; one or more road data collection systems 106; a database containing road data 108; at least one computer system 110 which may run software embodying an algorithm to compile and analyze road and weather data as described herein; and a network 112 that connects the RWIS database, the road data database, and the computer system.

Figure 2:
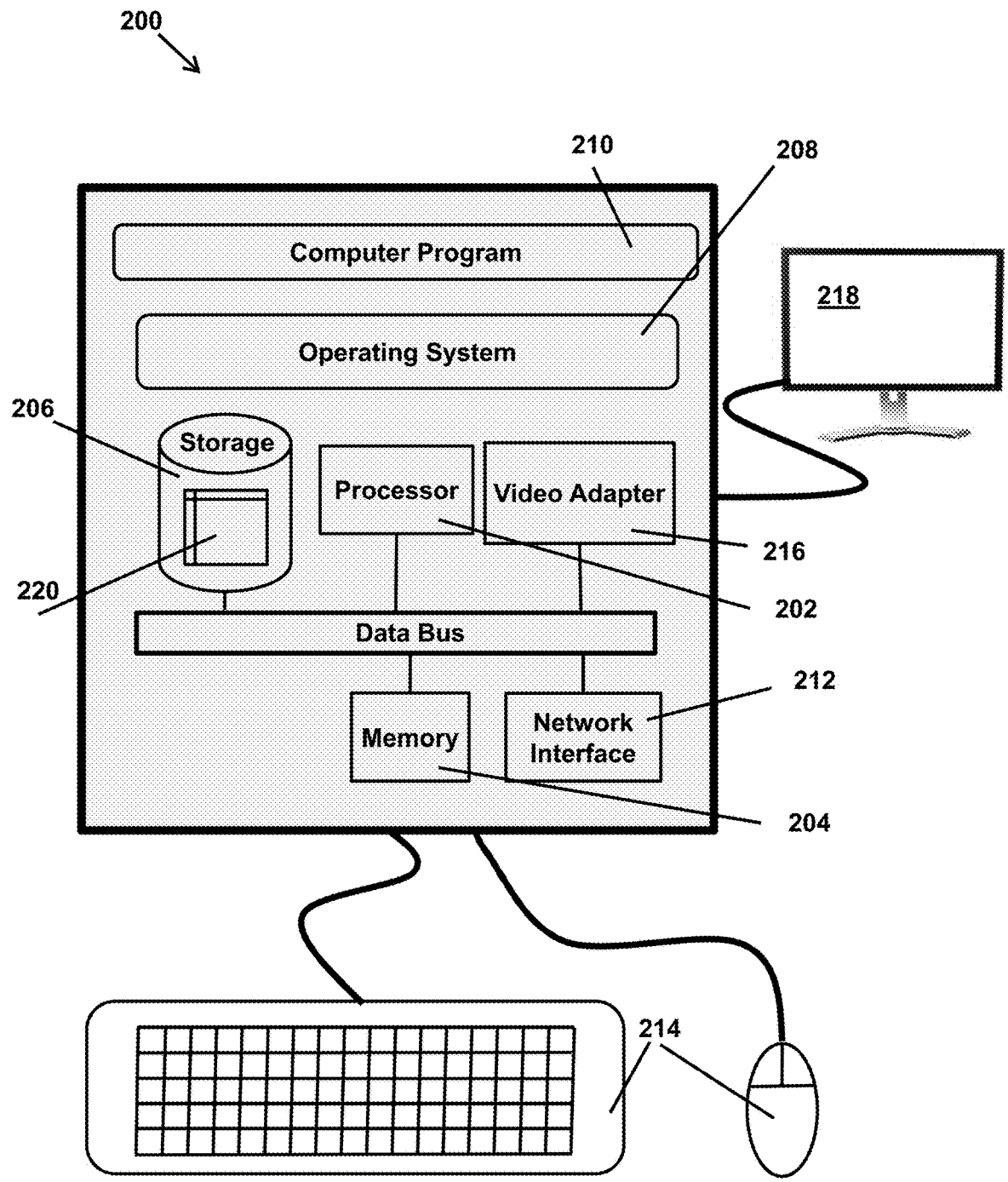
FIG. 2 is a diagram of a computer system executing a computer program which embodies the invention.

FIG. 2 shows an exemplary embodiment of a computer system 200 which may execute a software embodiment of the present invention. A desktop workstation is illustrated but the computer system may also be a laptop computer, a tablet computer, a virtual machine created on a network or cloud server, or other computing device configurable to execute software programs. Such a computer system may be comprised of a processor 202, memory 204, semi-permanent storage devices 206, an operating system 208, a software embodiment of the present invention 210, a network interface adapter 212, input devices 214, a display interface 216, and a display device 218. An exemplary embodiment of the present invention may create a database 220 within the semi-permanent storage device to house weather and traffic data for analysis. Such a database 220 may be alternately created in memory 204 of the computer system 200 or may be created in a remote resource located on a local area network, cloud network, or other location accessible by a computer system executing a software embodiment of the present invention.

Road Weather Information System

Figure 3:
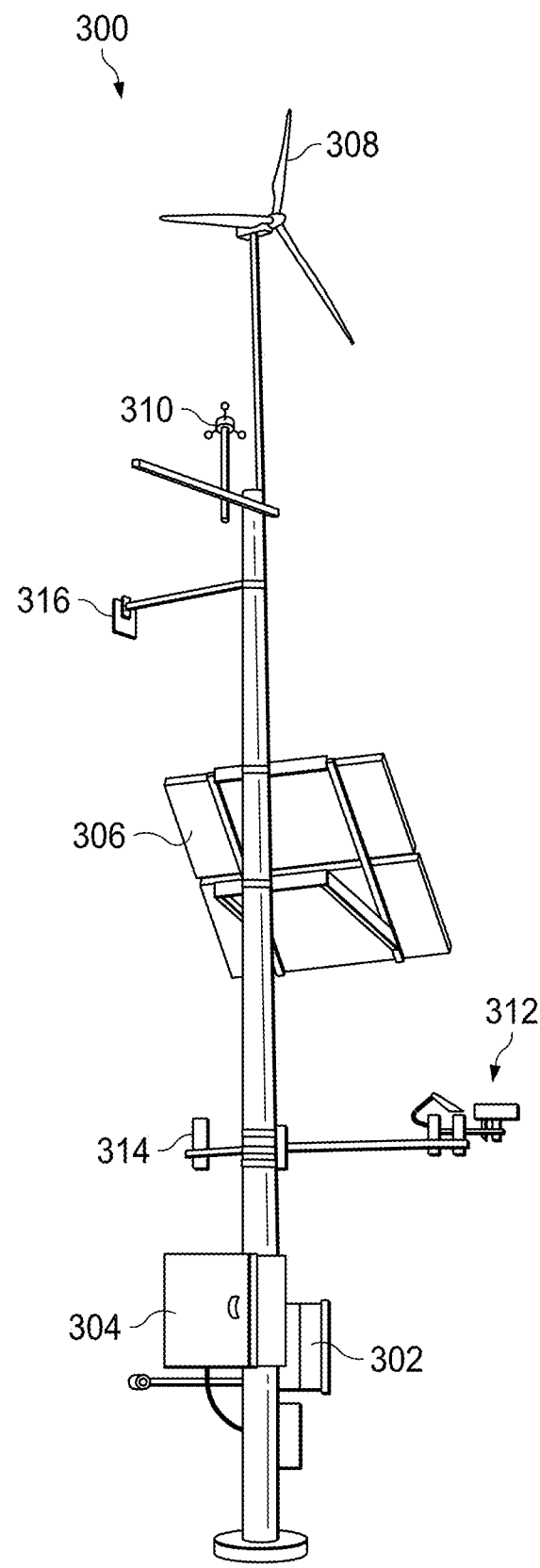
FIG. 3 is a pictorial illustration of a RWIS station.

FIG. 3 illustrates an exemplary RWIS station 300. RWIS stations may be located near selected roadways to remotely monitor and report weather conditions. Such reporting may be accomplished via a hard-wired connection to a reporting network or may be connected using a wireless data connection. Such communications may be accomplished by control circuitry 302 which may also be electrically connected to a power supply receiving power from a utility, a solar and wind rechargeable battery power system 304, or a combination of utility and battery power systems. As illustrated in FIG. 3, a solar panel 306 and wind turbine 308 may provide recharging power to such a battery system 304. An exemplary RWIS station may comprise a wind speed sensor 310, a precipitation sensor 312, a temperature and humidity sensor 314, and an interface to a wireless pavement sensor 316. Other embodiments of such an RWIS station may include pavement temperature sensors and ground accumulation precipitation sensors. Information from a system comprising a plurality of remote RWIS stations may be compiled in a computer database for later access. Such a database may comprise information related to precipitation, road surface temperature, snow and ice accumulation, wind speed, air temperature, and humidity levels. This information may be stored in such a database to facilitate searches by location, date, and time.

Traffic Information

Referring to FIG. 1, a traffic information system 106 may comprise a data compilation system 114 which may receive data from sources comprising GPS enabled vehicles 116, dash-mounted GPS navigation devices 118, roadway-mounted traffic sensor data 120, smart phones running GPS traffic applications (apps) 122, and other traffic information gathering services. The data compilation system 114 may combine received data and organize it in such a manner as to allow the data to be used to determine predicted traffic speeds for sections of roadway based on times of day and days of the week. Such data may also be organized such that speed and other traffic information may be retrieved for desired historical time periods for sections of roadway for which such data may have been compiled. In a potential embodiment of the claimed invention, such data may comprise actual vehicle speeds in five minute intervals for a desired section of roadway and a historical average speed for each of those same five minute intervals.

Database Construction

Figure 4A:
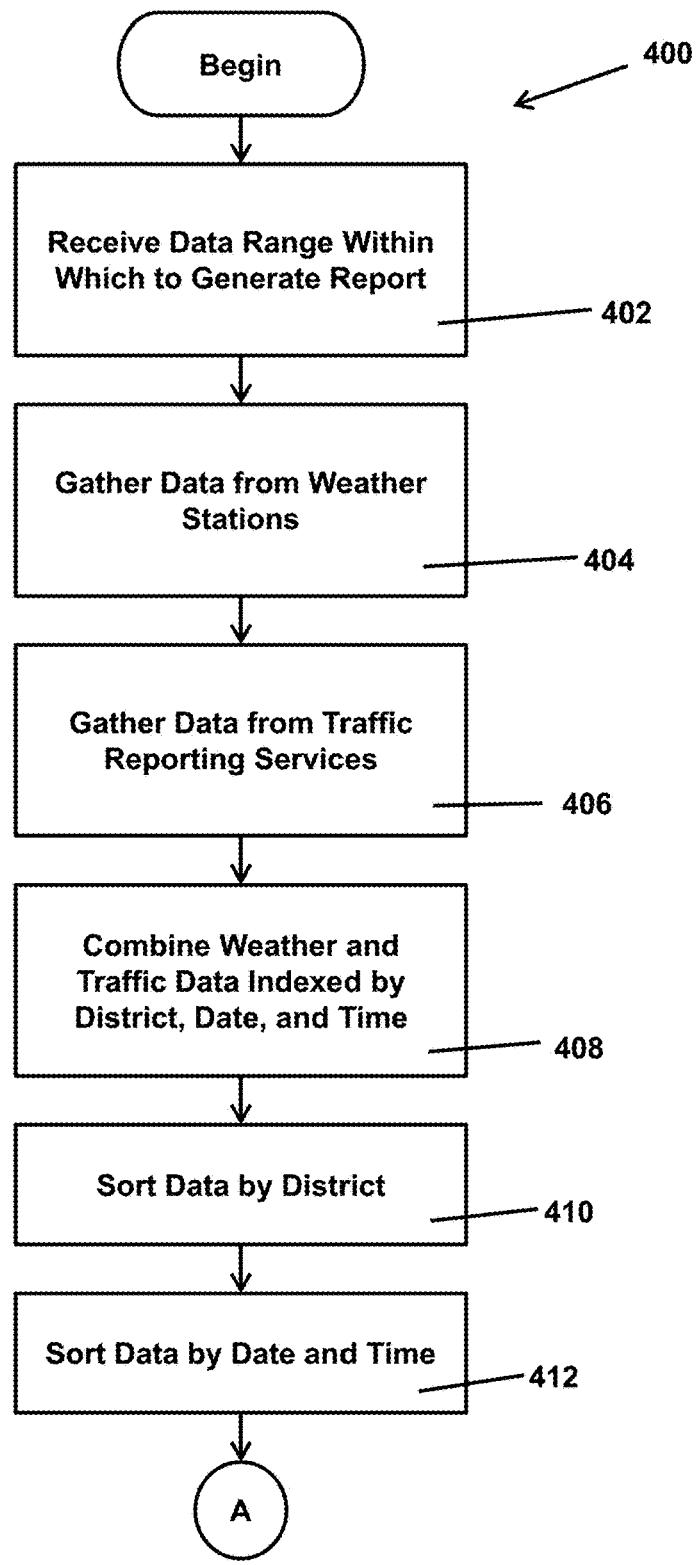
FIGS. 4A-4D are flow diagrams of a one embodiment of the present invention.
Figure 4B:
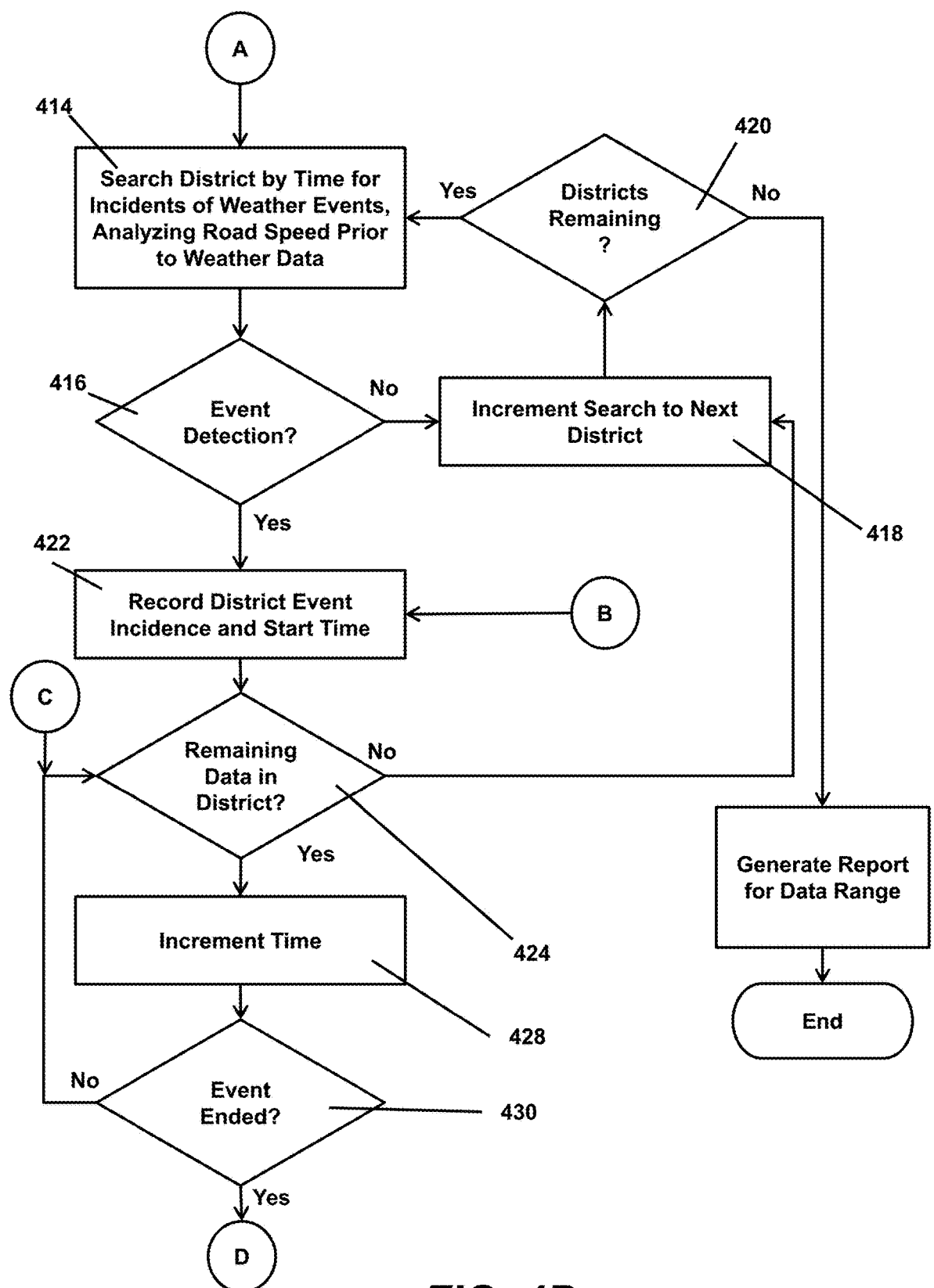
Figure 4C:
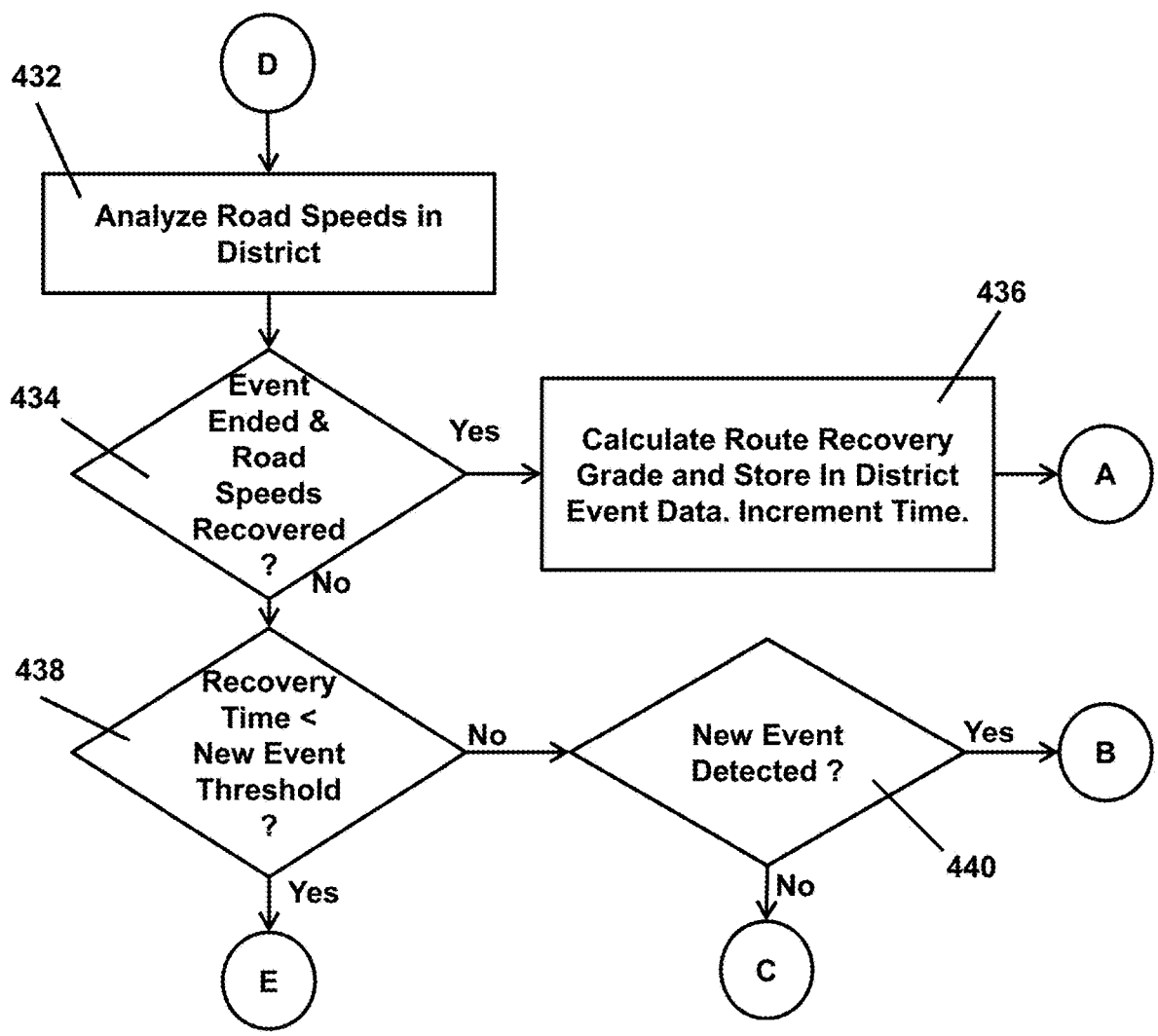
Figure 4D:
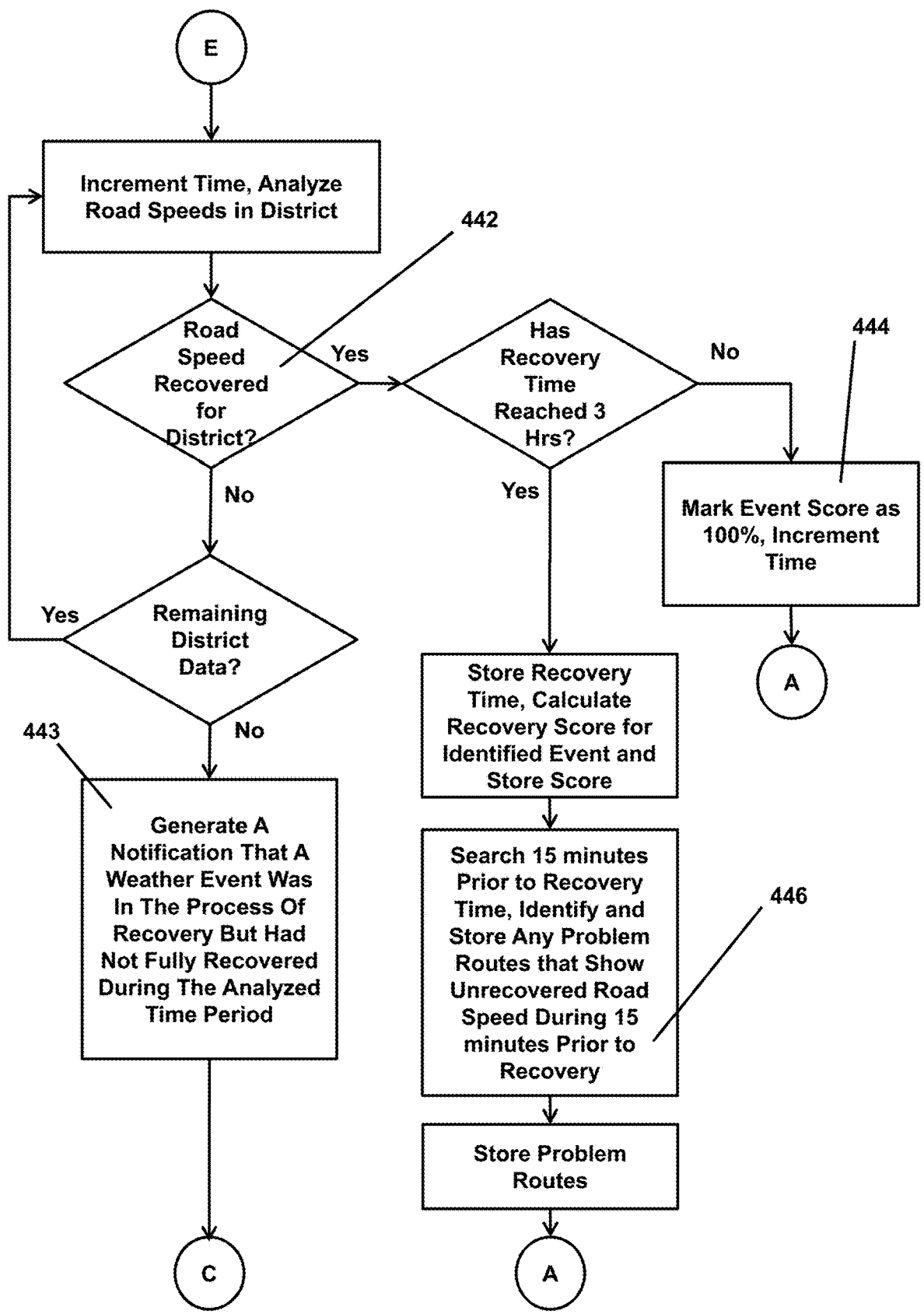

Referring to FIGS. 4a-4c, which illustrates a flow diagram 400 of an exemplary algorithm for performing the present invention, in step 402, a computer system 200 may receive a date and time range within which roadway maintenance analysis is to be performed. In step 404, data from weather sources, which may comprise RWIS stations, commercial weather reporting services, or other weather information sources, is received by the algorithm. In step 406, traffic data is received by the algorithm. Steps 404 and 406 may be automated by the algorithm or a user may initialize the algorithm by inputting data into a predetermined storage location in a computer system 200 for use by the algorithm. In step 408 the algorithm may combine received weather and traffic data into a database 220 maintained in the computer system 200 which may be indexed by geographic location, date, and time. An exemplary embodiment of the invention may further arrange geographic locations into predetermined districts to allow analysis and reporting in a manner consistent with existing resource allocation structures. In step 410, database data may be arranged such that geographic locations are grouped by district. In step 412, the database data may be sorted by data and time to form a database that is first arranged by district and then within each district arrangement is further arranged by date and time. One skilled in the art will understand that the data may be arranged in other configurations as long as the data elements of the database may be identified by geographic location after such data is analyzed by an embodiment of the inventive algorithm.

Figure 5:
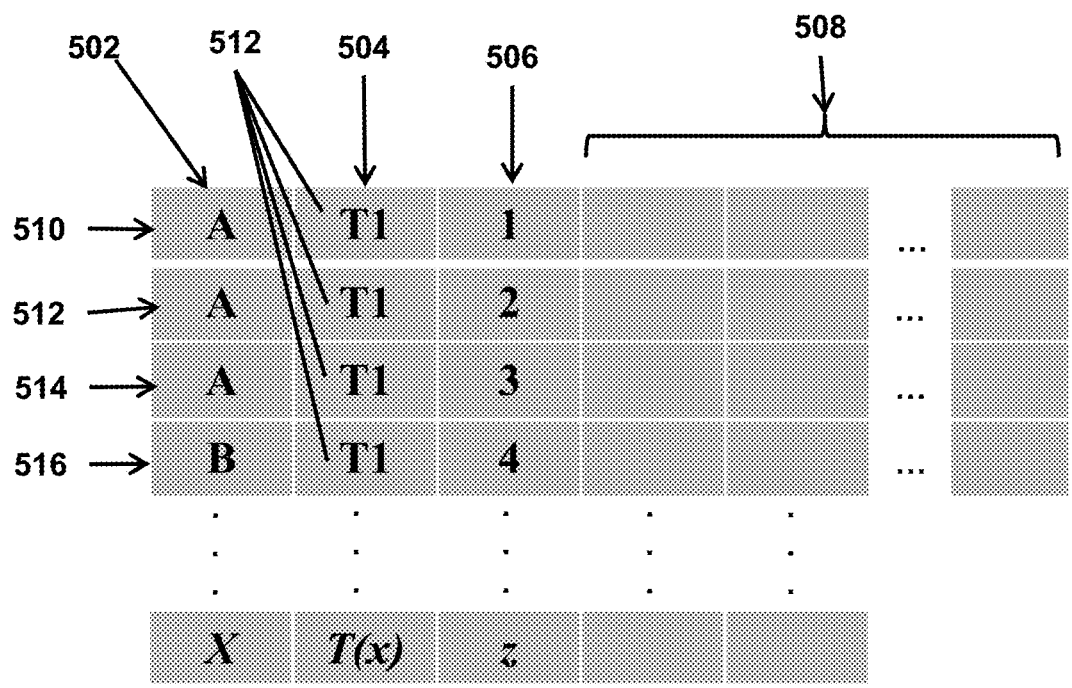
FIG. 5 is a diagram illustrative of an embodiment of a database combining weather and traffic data.

FIG. 5 graphically illustrates a portion of an embodiment of a resultant database configuration after the data is arranged as described above. Referring to FIG. 5, a column representative of district designation is shown at 502. A second column 504 may represent dates and time during which each row 510, 512, 514, 516 of data was obtained. A third column 506 may represent the geographic location from which the traffic and weather information contained in the remaining columns 508 is derived. It should be noted that a plurality of geographic locations may be included in the database for a given date and time. In FIG. 5, this is illustrated by multiple rows with the same date and time information in column 504 but different location identifiers in column 506. To further clarify this concept, data contained in row 510 is from location "1", which is contained within district "A". As shown in column 504, this data was acquired at time "T1". Data contained in row 512, is acquired at the same time, "Ti" but from a different location, "2". Note that data may be obtained from all available locations (distributed through the various districts) for a given time. For ease of description, the graphical illustration the database shown in FIG. 5 is limited to a small number of rows and columns of data. As implemented, such a database may contain a plurality rows and columns of data corresponding to data retrieved from weather and traffic information systems during the period of time being analyzed by software embodying the inventive algorithm.

Weather Event Detection

Figure 6:
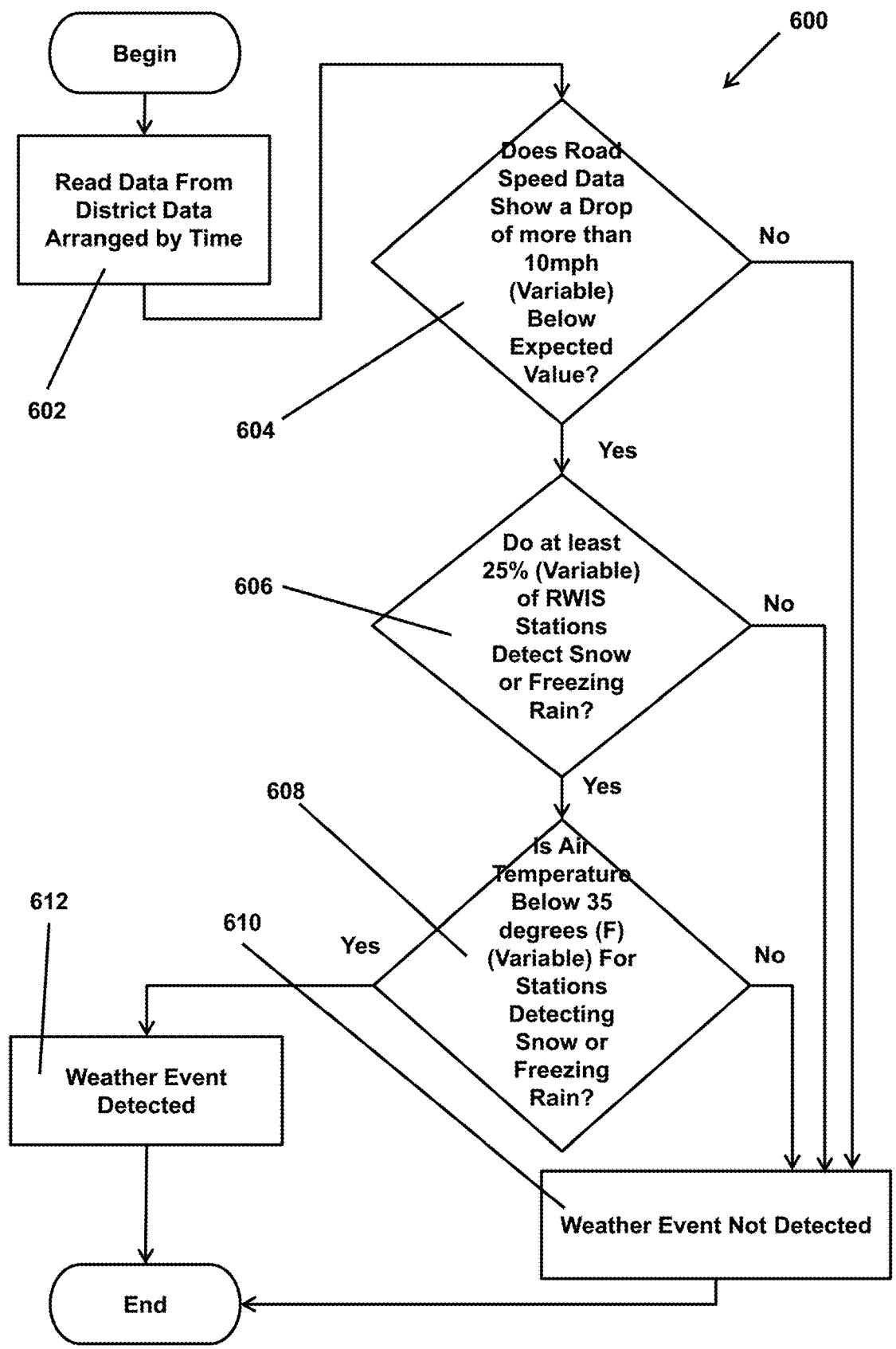
FIG. 6 is a flow diagram of an embodiment of that portion of the invention which analyzes database data to identify weather events.

After the database data is arranged as previously described, in step 414 an embodiment of the algorithm may search the database data for incidents of weather events. In a possible embodiment of the invention, a weather event may be a lower than expected traffic speed and an occurrence of snow or ice combined with other factors which may comprise, but are not limited to, low temperatures or moderate to high reported wind speeds. Referring to FIG. 6, which shows an embodiment of a sub-algorithm portion of the current inventive algorithm which identifies weather events 600. In step 602, data is retrieved from the previously described database in a manner in which database entries are retrieved starting with a first district. All database entries from a first district for a first period of time may be retrieved and stored in the memory 204 of the computer device 200 executing the algorithm. In step 604 the sub-algorithm analyses reported road speed to determine if the reported road speed indicates a drop of more than 10 MPH below the expected speed value for the first period of time. Such expected speed values may be retrieved from the traffic information system data. If the reported road speed values do not show such a drop in speed, a weather event may not be detected for the first period of time and the algorithm moves to step 610, ending the weather event detection sub-algorithm and returning to the main algorithm. If the sub-algorithm detects road speed values that drop greater than 10 mph below the expected speed value, the sub-algorithm advances to step 606. In step 606, the sub-algorithm may analyze weather data from the database entry to determine if 25% or more of the retrieved locations indicate a detection of snow or freezing rain. If such determination is not made, a weather event may not be detected (step 610) for the first period of time and the sub-algorithm ends. If the analysis reveals that 25% or more of the retrieved weather data indicates a detection of snow or ice, the algorithm moves to step 606. In step 606 the algorithm checks the air temperature recorded for each location reporting snow or freezing rain. If recorded air temperatures are 35 degrees F. or above, a weather event may not be detected for the first period in time and the algorithm moves to step 610, ending the event detection sub-algorithm. If the measured temperatures are below 35 degrees F., a weather event is detected (step 612) and the sub-algorithm is ended, returning to the main algorithm. In other embodiments of the invention, the percentage of weather reporting sources reporting snow or freezing rain, air temperature below which a weather event may be detected, and the mph drop in speed required to indicate an weather event may be assigned different predetermined values or may be user selectable during the execution of a computer program implementing the algorithm. The sub-algorithm for identifying weather events 600 may be repeated, data for the next period of time may be retrieved and stored in memory, replacing the data for the first period of time used in the sub-algorithm, until all data for the first district has been analyzed.

Returning to FIGS. 4a-4c, as illustrated in step 416, the inventive sub-algorithm described above may be repeated for a second period in time and additional periods in time thereafter until all periods in time for the current district have been analyzed for weather events. If no weather events are detected in the analysis process performed in the sub-algorithm, the main algorithm may increment the search parameters to the next district in step 418. The algorithm determines if there are any remaining districts in the database 220 in step 420. If there are additional districts, the algorithm repeats steps 414, 416, 418, and 420 until there are no remaining un-analyzed districts in the database 220. When no remaining unanalyzed districts have been detected, the algorithm executes the report generation sub-algorithm in step 422. The report sub-algorithm will be detailed below.

Event Analysis

When the weather event detection sub-algorithm 600 detects a weather event, the main inventive algorithm 400 records the weather event start time. The algorithm checks for remaining time periods for the district being analyzed in step 424. If there are no additional times for the district in the database 220, the search is incremented to the next district in step 420 and the algorithm continues to execute. In the event that a weather event was detected and does not end (as will be described below), the algorithm may not report the weather event. Such a weather event that does not end during the time period represented by the analyzed data may likely be detected and reported during the analysis of data representing a subsequent time period. If there are remaining time periods for the district, the time period being analyzed is incremented to the next time period in step 428. In Step 430 an event end detection sub-algorithm is executed.

Figure 7:
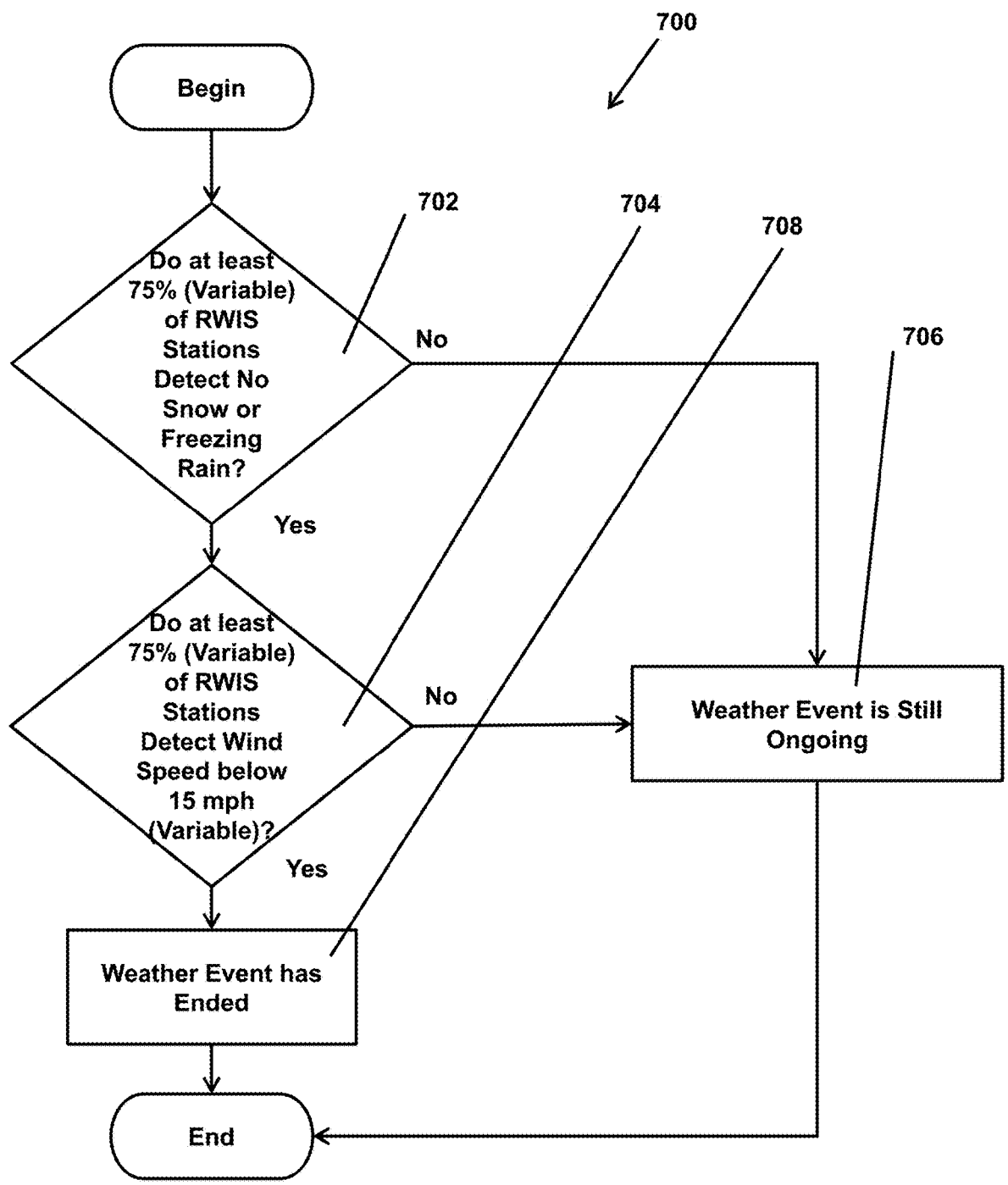
FIG. 7 is a flow diagram of an embodiment of that portion of the invention which analyzes database data to identify the end of a weather event.

Referring to FIG. 7, which illustrates an embodiment of an event end detection sub-algorithm 700, in step 702 the event end detection sub-algorithm analyzes reported weather data for the current time period and the current district to determine if greater than 25% of the reporting weather sources report snow or freezing rain. If such conditions are present, the sub-algorithm may return an indication that the weather event is still ongoing 706. In step 704, if 25% or less of the weather sources report snow or freezing rain, the sub-algorithm analyses wind speed reported during the current time period and in the current district. If greater than 25% of the reporting weather sources report wind speeds in excess of 15 mph, the sub-algorithm may report that the weather event is still ongoing 706. If the wind speed analysis step indicates that at least 75% of the reporting weather sources report wind speeds below 15 mph, the sub-algorithm may report that the weather event has ended 708.

Referring to FIG. 4, when a weather event has been determined to have ended, an embodiment of the inventive algorithm may record an weather event end time and, in step 432, start to analyze traffic speed in the currently analyzed district to determine if road surface conditions have improved sufficiently to allow traffic speeds to approach those speeds that are expected for the analyzed segment of roadway during the time period being analyzed. An embodiment of the inventive algorithm may determine that road speeds which are within 10 mph of expected values for 95% of the designated routes within the analyzed district may indicate a successful maintenance effort 434. If such an indication is made, step 436 calculates a performance grade as described below and stores the district recovery grade for later reporting. The algorithm then returns to step 414 to search for additional weather events to analyze.

Because weather events may end and then restart within a short time, the algorithm may analyze weather data for a predetermined period of time after an event is determined to have ended. These steps are performed in order to confirm that the weather causing the weather event has ended and not just temporarily subsided. A possible embodiment of the invention may use 1 hour as the predetermined period of time. Other embodiments of the invention may use different values for such a predetermined value or allow the value to be user-selectable during the execution of a software embodiment of the invention. In the embodiment illustrated, step 438 performs the weather event detection sub-algorithm 600 to detect a restart of a weather event. If the weather event detection sub-algorithm 600 detects such an event restart (step 440), the event end indication previously reported in step 430 is deleted and the algorithm returns to step 424. If the weather event does not re-start within the predetermined time, the algorithm increments the time period being analyzed and reviews road speed reported during the new time period to determine if such road speeds have recovered from the weather event.

In step 442 an embodiment of the inventive algorithm may determine that road speeds which are within 10 mph of expected values for 95% of the designated routes within the analyzed district indicate a successful maintenance effort. If a successful maintenance effort is not determined in step 442, the algorithm checks for additional district data and if additional data is found, the algorithm increments the time period being analyzed and returns to step 442. If the algorithm determines that there is no additional data available for the current district algorithm may generate a notification that a weather event had not fully recovered in step 443 and return to step 424 to continue the analysis process.

Performance Grade Details

When an embodiment of the inventive algorithm determines that road speed has recovered for the district in step 442, a grading process is performed. The grading process scores the maintenance efforts based on the time that has elapsed between the time that weather event was determined to have ended and the time that road speeds were determined to indicate a successful maintenance effort ("Recovery Time"). If the recovery time is less than or equal to three hours, the grading process may return a score of 100% in step 444. If the recovery time is equal to or greater than six hours, the grading process may return a score of 0%. Recovery times between three and six hours result in a pro-rated score.

When responding to a weather event, road maintenance efforts may be effective on most routes to which such efforts are applied. However, certain roadway characteristics, weather behavior, the frequency and methods of maintenance, and various other factors may result in conditions in which a roadway or roadways do not respond to maintenance as anticipated or desired. Such circumstances may result in sections of roadway that lag behind the majority of sections in a district as maintenance is performed. Identification of these routes may be desirable to allow for later review of the circumstances leading to such a result. As illustrated in step 446, to identify routes which may have contributed to a performance score of less than 100%, the algorithm may, when recovery time is greater than three hours, analyze road speed data within the last fifteen minutes prior to the indication of a successful maintenance effort. Routes that have speeds below what are considered by the algorithm to indicate recovery from a weather event within these last fifteen minutes are recorded as problem routes by the algorithm.

Report Generation

Figure 8:
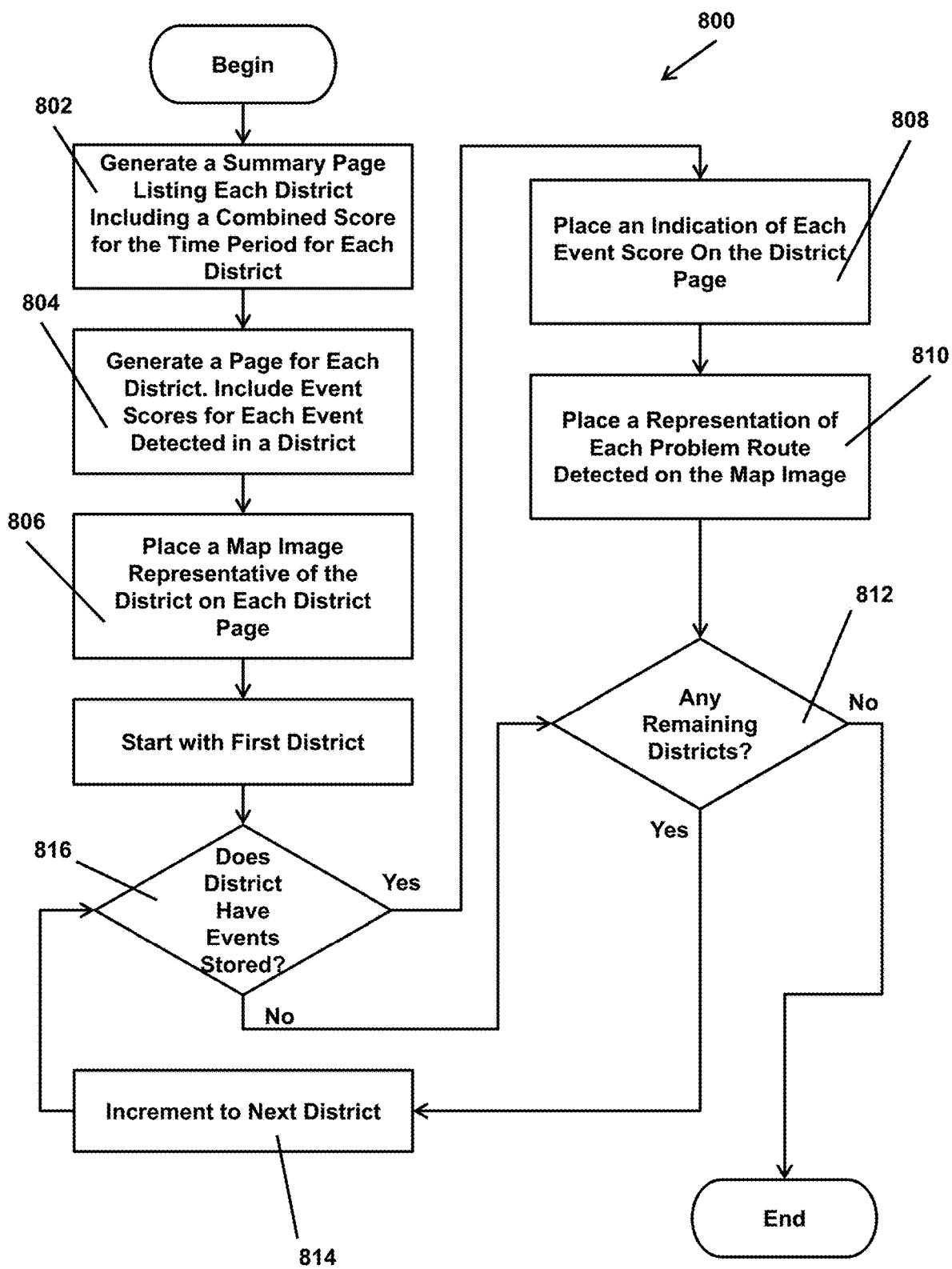
FIG. 8 is a flow diagram of an embodiment of that portion of the invention which generates a report of the effectiveness of the maintenance response to weather events.
Figure 9:
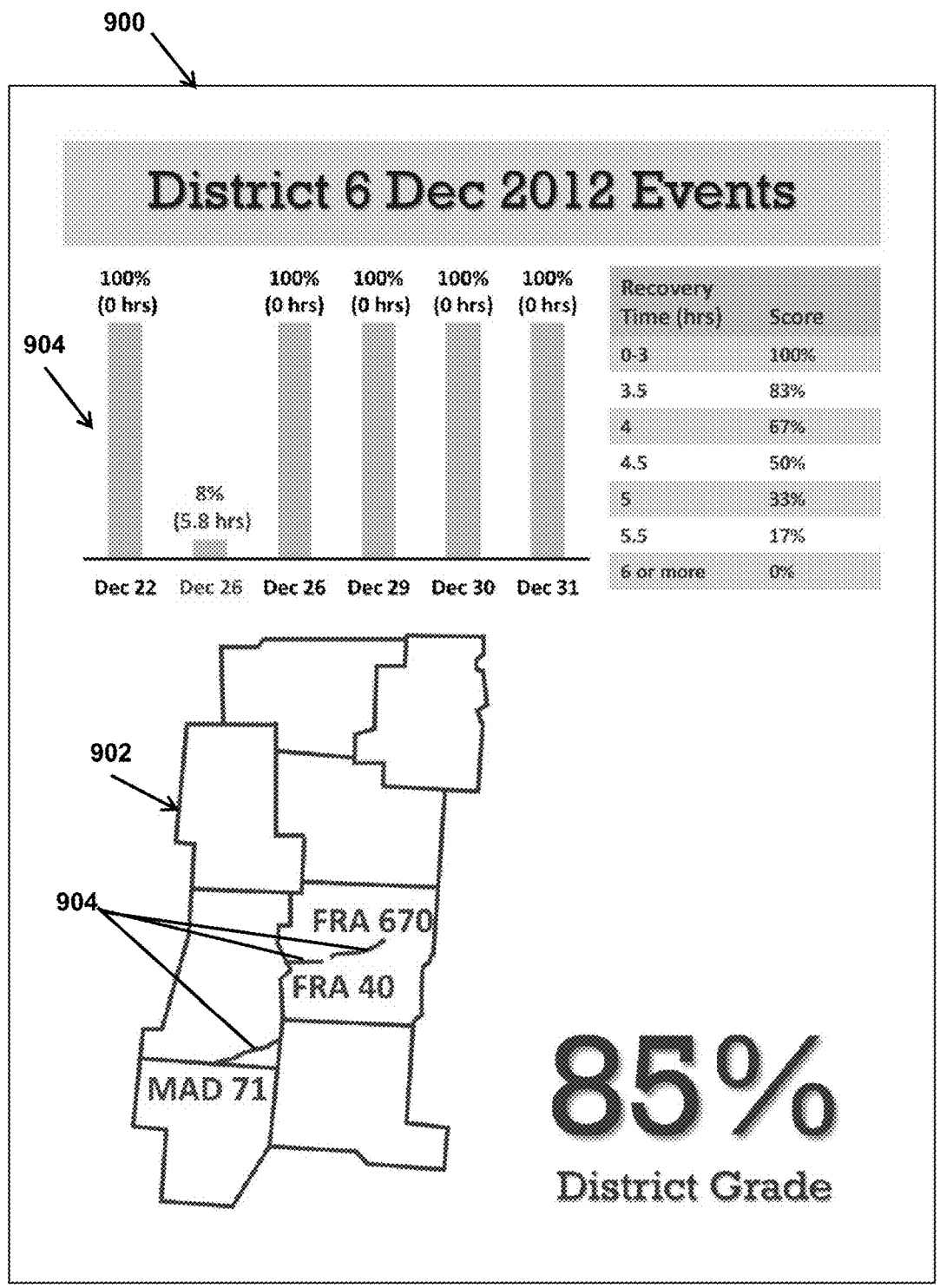
FIG. 9 is an illustration of a page of an embodiment of a report generated by the invention.

The above algorithm and sub-algorithms repeat until all time periods for all districts found in the database 220 are analyzed. When all such analysis is complete, a report may be generated. Referring to FIG. 8, which illustrates a flow chart 800 of the steps to generate an embodiment of a report detailing the roadway maintenance effectiveness scores in response to weather events as described previously. When describing the generation of a report, one skilled in the art will understand that "generated" or "generation" should be interpreted to mean the creation of an image which may be printed or electronically displayed to convey to a viewer the information contained therein. In step 802, a summary page is generated which may list each district with data contained in the database 220 analyzed by the algorithm. In step 804 a page may be generated for each district. An embodiment of such a page is illustrated in FIG. 9 as 900. In step 806 a map image 902 may be placed on each such page. In another embodiment of the invention, such a map image may be a wireframe outline representing geographic boundaries (such as county lines) that may be contained within a district.

In step 808, scores calculated for each event identified for the district 904 are placed on the page corresponding to the district. In step 810, any problem routes identified in step 446 of the algorithm are placed on the map image 902 at their approximate location 904. In steps 814 and 816, the process is repeated for each district for which database 220 data was analyzed in the inventive algorithm. After the process has been repeated for each district, the result may be a report comprising an overall summary of district performance as well as more detailed views of each district's performance data. Such a report may allow for review of road maintenance efforts in order to determine best maintenance practices and more effective allocation of resources for performing road maintenance.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for analyzing the effectiveness of road maintenance efforts within a district, the system comprising:

a plurality of road weather information stations ("RWIS"), each comprising one or more sensors configured to gather weather conditions data for an area within the district;

a traffic information system configured to obtain traffic speed information data for vehicles traveling within the district comprising measured vehicle speeds and predicted vehicle speeds;

an analytics system in networked electronic communication with the traffic information system and each of the plurality of RWIS, wherein said analytics system comprises one or more electronic storage devices comprising computer-executable instructions, which when executed, configures one or more processors to:

receive said weather condition data from said plurality of RWIS and traffic speed information data from the traffic information system over a period of time;

analyze said received data to detect a beginning time of a weather event where a combination of a first set of weather conditions in said received weather conditions data and a first set of traffic conditions in said received traffic speed information data is found at a given time indicating a presence of weather conditions requiring road maintenance efforts;

analyze said received data associated with a time occurring chronologically after the beginning time of the weather event to detect an end time of the weather event, wherein the end time of the weather event is determined by the presence of a second set of weather conditions indicating a non-presence of said weather conditions requiring road maintenance efforts;

analyze said received data associated with a time occurring within a predetermined period chronologically after the beginning time of the weather event to determine a difference between average measured vehicle speeds and predicted vehicle speeds for the same point in time; and indicate successful completion of road maintenance efforts for the weather event where the difference is less than a margin of error;

wherein said first set of weather conditions is defined, at least in part, by:
  temperatures at or below a predetermined temperature threshold; and
  at least a predetermined percentage of said plurality of RWIS reporting precipitation;

wherein said first set of traffic conditions is defined, at least in part, by said measured vehicle speeds below the predicted vehicle road speeds by more than a predetermined speed amount;

wherein said second set of weather conditions are defined, at least in part, by less than the predetermined percentage of said plurality of RWIS reporting precipitation.

2. The system of claim 1 further comprising:
additional computer-executable instructions located at the one or more electronic storage devices of said analytics system, which when executed, configures the one or more processors to indicate unsuccessful completion of road maintenance efforts for the weather event where the difference is greater than the predetermined amount during the predetermined period chronologically after the beginning time of the weather event.

3. The system of claim 1 wherein:
the predetermined temperature threshold is thirty-five degrees Fahrenheit.

4. The system of claim 1 wherein:
the predetermined period chronologically after the beginning time of the weather event is at least three hours.

5. The system of claim 1 wherein:
said precipitation comprises snow or freezing rain.

6. The system of claim 1 wherein:
the predetermined percentage is at least twenty-five percent.

7. The system of claim 1 wherein:
the predetermined speed amount is at least ten miles per hour.

8. The system of claim 1 further comprising:
additional computer-executable instructions located at the one or more electronic storage devices of said analytics system, which when executed, configures the one or more processors to:
  identify certain roadways geographically located at least partially within said district;
  calculate a performance score for maintenance efforts for each of said identified roadways during said weather event, wherein said performance score comprises a non-temporal grade;
  calculate an overall performance score for maintenance efforts for said district during said weather event, wherein said overall performance score is provided in the form of said non-temporal grade;
  identify certain of said calculated performance scores below a predetermined acceptable score threshold;
  further identify certain of said identified roadways associated with a given one of the calculated performance scores below the predetermined score threshold; and
  transmit instructions sufficient to generate a summary report for display at one or more electronic displays comprising a map depicting the district, representations within said map of said further identified roadways graphically depicted as highlighted roadways at positions on said map commensurate with geographic locations of the further identified roadways within the district, identification of said weather event, and said cumulative performance score for said district.

9. The system of claim 1 wherein:
said traffic speed information data is gathered for a sample of vehicles traveling within the district.

10. The system of claim 9 wherein:
sources for said traffic speed information data comprise location tracking enabled vehicles, navigation devices, roadway mounted traffic sensors, and location tracking applications on personal electronic devices.

11. The system of claim 1 wherein:
said received data is combined, organized chronologically, indexed, and stored at one or more databases in networked electronic communication with said analytics system.

12. The system of claim 1 wherein:
said one or more sensors of each of said plurality of RWIS comprise a wind speed sensor, a precipitation sensor, and a temperature sensor.

13. A system for analyzing effectiveness of road maintenance efforts associated with weather events within a geographic area, the system comprising:
an analytics subsystem;
a weather information subsystem configured to automatically and electronically provide ambient weather conditions data generated by one or more sensors for one or more subareas in said geographic area to said analytics subsystem, wherein each of said subareas is associated with one or more roadways within said geographic area;
a traffic information subsystem configured to automatically and electronically provide vehicle traffic speed data comprising measured vehicle speeds for at least some vehicles traveling on said roadways within said geographic area to said analytics subsystem;
one or more databases configured to automatically and electronically provide predicted vehicle speeds data comprising predicted vehicle speeds for vehicular traffic on said roadways within said geographic area to said analytics subsystem; and
computer-executable instructions associated with said analytics subsystem, which when executed configure one or more processors to:
  combine said ambient weather conditions data received from said weather information subsystem, said vehicle traffic speed data received from said traffic information subsystem, and said predicted vehicle speeds data received from said one or more databases;
  organize said combined data by date, time, roadway;
  identify an effective beginning time for each of a number of weather events by analyzing said organized data to determine where a difference between said measured vehicle speeds and said predicted vehicle speeds for one or more of said roadways is greater than a predetermined threshold at a point of time and more than a predetermined percentage of said one or more sensors of said weather information subsystem for each of said subareas associated with said one or more of said roadways report precipitation and ambient air temperatures below a given threshold at the point of time;
  identify an effective end time for each of said number of weather events where less than said predetermined percentage of said one or more sensors of said weather information subsystem for each of said subareas associated with said one or more of said roadways report precipitation and ambient air temperatures below the given threshold;

identify an effective completion of road maintenance efforts time for each of said weather events chronologically later than a respective one of said effective end times of a respective one of said number of weather events where said measured vehicle speeds for said one or more of said roadways are within a predetermined range of said predicted speeds; and determine an elapsed time for each of said weather events between a respective one of said effective completion of road maintenance efforts times and said respective one of said effective end times as an amount of time for effective completion of road maintenance efforts.

14. The system of claim 13 wherein:

said organization of said combined data by date, time, roadway is accomplished by indexing.

15. The system of claim 13 further comprising:

additional computer-executable instructions associated with said analytics subsystem, which when executed configures said one or more processors to:

calculate a performance score for each of said weather events based on said elapsed time, wherein said performance score comprises a non-temporal grade; and generate a summary report indicating each of said performance scores.

16. A system for analyzing the effectiveness of road maintenance efforts for roadways within districts, the system comprising:

a plurality of road weather information stations ("RWIS"), each associated with one or more of the roadways within one or more of the districts and configured to gather weather conditions data for an area within one or more of the districts;

a traffic information system comprising predicted vehicle speeds and measured vehicle speeds for vehicles traveling on one or more of the roadways within one or more of said districts, wherein said measured vehicle speeds are gathered from one or more sources comprising traffic sensors, location tracking enabled vehicles, navigation devices, and location tracking applications on personal electronic devices;

a computerized analytics system in electronic communication with the traffic information system and each of the plurality of RWIS by way of a network, wherein said computerized analytics system comprises computer-executable instructions, which when executed, configure one or more processors to:

receive said weather condition data from the plurality of RWIS;

receive said measured and predicted vehicle speeds from said traffic information system;

receive a user selection of one of said districts for analysis, and for at least certain of said roadways in said user selected district:

analyze at least said received weather conditions data, said received measured vehicle speeds, and said received predicted vehicle speeds for said user selected district to detect an effective beginning time for a weather event requiring road maintenance efforts;

analyze at least said received weather conditions data for said user selected district to detect an effective end time for the weather event occurring chronologically after the effective beginning time for said weather event;

analyze at least said received measured and predicted vehicle speeds associated with each of said at least certain of said roadways in said user selected district to detect, on a roadway specific basis, an effective completion of road maintenance efforts time for the weather event occurring chronologically after the effective end of the weather event where a difference between said measured vehicle speeds and said predicted vehicle speeds is less than a predetermined amount; and determine an elapsed time between said effective end time for the weather event and said effective completion of roadway maintenance efforts time for said weather event on said roadway specific basis;

derive a roadway score for each of said at least certain of said roadways in said user selected district based on said elapsed times for each of said weather events, wherein said roadway score comprises a non-temporal grade;

derive an event specific district score for said user selected district based on said roadway scores for each of said weather events; and derive an overall district score for said user selected district based on said event specific scores for said user selected district;

wherein said effective beginning time for said weather event requiring road maintenance efforts is determined from analyzing said received weather conditions data, said received measured vehicle speeds, and said received predicted vehicle speeds for said user selected district at a given time.

17. The system of claim 16 wherein:

each of said RWIS comprise a precipitation sensor and a temperature sensor.

18. The system of claim 16 wherein:

said computerized analytics system comprises additional computer-executable instructions, which when executed further configures the one or more processors to generate a summary report for display at one or more displays comprising a map depicting the user selected district and any of said certain of said roadways in said user selected district having an associated one of the numerical scores below a predetermined threshold as graphical representations of the roadways at corresponding locations on the map.

19. The system of claim 18 wherein:

said summary report further comprises each of said event specific district scores and said overall district score;

said overall district scores comprises a numerical average of said event specific district scores provided in the form of said non-temporal grade; and said event specific district scores are provided in the form of said non-temporal grade.

* * * * *